United States Patent
Gellerich et al.

(10) Patent No.: US 8,839,253 B2
(45) Date of Patent: Sep. 16, 2014

(54) SYSTEM AND METHOD FOR LOAD-ADAPTIVE MUTUAL EXCLUSION WITH WAITING PROCESS COUNTS

(75) Inventors: Wolfgang Gellerich, Boeblingen (DE);
Martin Schwidefsky, Boeblingen (DE);
Holger Smolinski, Simmozheim (DE)

(73) Assignee: International Business Machines Corporation, Armonk, NY (US)

( * ) Notice: Subject to any disclaimer, the term of this patent is extended or adjusted under 35 U.S.C. 154(b) by 1398 days.

(21) Appl. No.: 12/141,269

(22) Filed: Jun. 18, 2008

(65) Prior Publication Data

US 2009/0320028 A1    Dec. 24, 2009

(51) Int. Cl.
*G06F 9/30* (2006.01)
*G06F 9/52* (2006.01)

(52) U.S. Cl.
CPC ..................................... *G06F 9/526* (2013.01)
USPC ........................... 718/102; 712/216; 712/219

(58) Field of Classification Search
CPC ....................................................... G06F 8/458
USPC ................................... 718/102; 712/216, 219
See application file for complete search history.

(56) References Cited

U.S. PATENT DOCUMENTS

| | | | |
|---|---|---|---|
| 2004/0010499 A1* | 1/2004 | Ghosh et al. | 707/100 |
| 2005/0080963 A1 | 4/2005 | Schopp | |
| 2005/0081204 A1 | 4/2005 | Schopp | |
| 2008/0184238 A1* | 7/2008 | Ruemmler | 718/102 |

* cited by examiner

*Primary Examiner* — Robert Fennema
(74) *Attorney, Agent, or Firm* — Schmeiser, Olsen & Watts, LLP; Randall Bluestone

(57) ABSTRACT

A system and associated method for mutually exclusively executing a critical section by a process in a computer system. The critical section accessing a shared resource is controlled by a lock. The method measures a detection time when a lock contention is detected, a wait time representing a duration of wait for the lock at each failed attempt to acquire the lock, and a delay representing a total lapse of time from the detection time till the lock is acquired. The delay is logged and used to calculate an average delay, which is compared with a suspension overhead time of the computer system to determine whether to spin or to suspend the process while waiting for the lock to be released. The number of processes waiting for the lock and the number of processes suspended are respectively counted to optimize the method.

15 Claims, 5 Drawing Sheets

SYSTEM AND METHOD FOR LOAD-ADAPTIVE MUTUAL EXCLUSION WITH WAITING PROCESS COUNTS

FIELD OF THE INVENTION

The present invention discloses a system and associated method for executing a critical section accessing a shared resource that is dynamically adaptive to workloads and utilization of a multi-threaded computer system.

BACKGROUND OF THE INVENTION

Conventional mutual exclusion methods for parallel processes to share a resource in a computer system are not optimized pursuant to dynamic behaviors of processes contending for the resource. Consequently, conventional mutual exclusion methods have lower performance and utilization of the computer system, have unnecessary overheads in acquiring and releasing the resource in contention, and consume more electrical energy than necessary due to wasted processor cycles. Even in conventional mutual exclusion employing an adaptive approach, a decision algorithm does not reflect dynamically changing workloads on the computing system resulting in counterproductive lock waits.

Thus, there is a need for a system and associated method that overcomes at least one of the preceding disadvantages of current methods and systems of mutual exclusion.

SUMMARY OF THE INVENTION

The present invention provides a method for mutually exclusively executing a critical section by a process in a computer system, wherein a lock permits the process an access to the critical section, the method comprising:

upon detecting that the lock is held by another process, adding one (1) to a waiter count that represents the number of processes waiting for the lock, measuring a detection time that represents the time of said detecting, and measuring a current time representing a present time;

subsequent to said adding, repeating at least one iteration comprising steps of determining a waiting mode of the process, and subsequently attempting to acquire the lock, wherein the waiting mode is determined such that the process in the waiting mode wastes the least amount of time while waiting for the lock pursuant to at least one delay stored in a lock delay history data structure and a suspension overhead time of the computer system;

subsequent to said repeating, acquiring the lock for the process;

subsequent to said acquiring, calculating a delay representing a difference between a release time representing when the lock is released and the detection time;

subsequent to said calculating, storing the calculated delay in the lock delay history data structure; and subsequent to said storing, subtracting one (1) from the waiter count, wherein said adding, said repeating, said acquiring, said calculating, said storing, and said subtracting are performed by a locking function invoked by the process.

The present invention provides a computer program product, comprising a computer usable storage medium having a computer readable program code embodied therein, said computer readable program code containing instructions that when executed by a processor of a computer system implement a method for mutually exclusively executing a critical section by a process in a computer system, wherein a lock permits the process an access to the critical section, the method comprising:

upon detecting that the lock is held by another process, adding one (1) to a waiter count that represents the number of processes waiting for the lock, measuring a detection time that represents the time of said detecting, and measuring a current time representing a present time;

subsequent to said adding, repeating at least one iteration comprising steps of determining a waiting mode of the process, and subsequently attempting to acquire the lock, wherein the waiting mode is determined such that the process in the waiting mode wastes the least amount of time while waiting for the lock pursuant to at least one delay stored in a lock delay history data structure and a suspension overhead time of the computer system;

subsequent to said repeating, acquiring the lock for the process;

subsequent to said acquiring, calculating a delay representing a difference between a release time representing when the lock is released and the detection time;

subsequent to said calculating, storing the calculated delay in the lock delay history data structure; and subsequent to said storing, subtracting one (1) from the waiter count, wherein said adding, said repeating, said acquiring, said calculating, said storing, and said subtracting are performed by a locking function invoked by the process.

The present invention provides a computer system comprising a processor and a computer readable memory unit coupled to the processor, said memory unit containing instructions that when executed by the processor implement a method for mutually exclusively executing a critical section by a process in a computer system, wherein a lock permits the process an access to the critical section, the method comprising:

upon detecting that the lock is held by another process, adding one (1) to a waiter count that represents the number of processes waiting for the lock, measuring a detection time that represents the time of said detecting, and measuring a current time representing a present time;

subsequent to said adding, repeating at least one iteration comprising steps of determining a waiting mode of the process, and subsequently attempting to acquire the lock, wherein the waiting mode is determined such that the process in the waiting mode wastes the least amount of time while waiting for the lock pursuant to at least one delay stored in a lock delay history data structure and a suspension overhead time of the computer system;

subsequent to said repeating, acquiring the lock for the process;

subsequent to said acquiring, calculating a delay representing a difference between a release time representing when the lock is released and the detection time;

subsequent to said calculating, storing the calculated delay in the lock delay history data structure; and subsequent to said storing, subtracting one (1) from the waiter count, wherein said adding, said repeating, said acquiring, said calculating, said storing, and said subtracting are performed by a locking function invoked by the process, and wherein the detection time, the current time, the delay, and the suspension overhead time is measured by a respective count of processor cycles of the computer system.

The present invention provides a method and system that overcomes at least one of the current disadvantages of conventional method and system for a mutual exclusion.

DETAILED DESCRIPTION OF THE INVENTION

Figure 1:
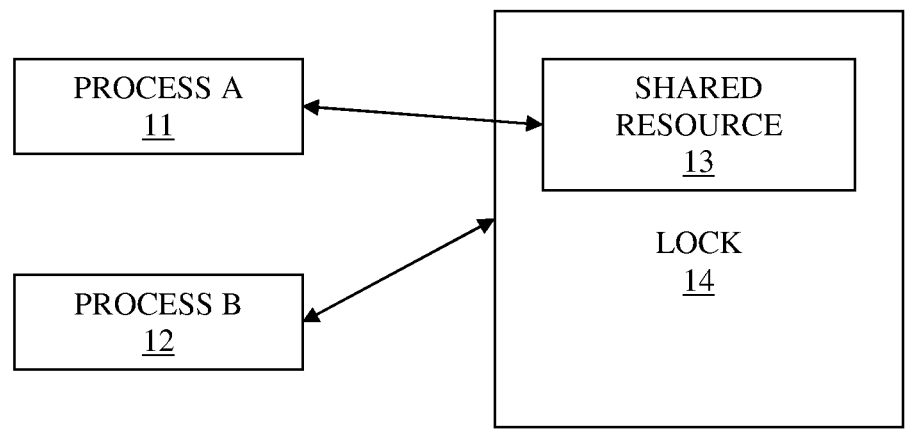
FIG. 1 illustrates a system for mutual exclusion that is employed in a computer system to make a shared resource available to a process wherein the shared resource is contended by more than one process, in accordance with embodiments of the present invention.

FIG. 1 illustrates a system for mutual exclusion 10 that is employed in a computer system to make a shared resource available to a process wherein the shared resource is contended by more than one process, in accordance with embodiments of the present invention.

The resource locking system 10 comprises at least one process, 11 and 12, and a shared resource 13 that is accessed through a lock 14.

Said at least one process, 11 and 12, accesses the shared resource 13 within the computer system. A process, 11 or 12, of said at least one process uses processor cycles to execute a program context of the process, which is referred to as a thread of execution, or a thread. A part of the process accessing the shared resource 13 is referred to as a critical section. When there is more than one process attempting to execute the critical section for the shared resource 13, only one process of said more than one process can execute the critical section and accesses the shared resource 13. This way of executing the critical section is referred to as a mutual exclusion or a mutually exclusive execution.

The lock 14 refers to a data structure implementing the mutual exclusion. Conventional data structures implementing the mutual exclusion are referred to as, inter alia, a semaphore, a mutex, a lock, etc. The lock 14 is held by only one process at a time for a single instance of the shared resource 13 to ensure that the shared resource 13 is accessed and/or modified in a ways that data integrity of the shared resource 13 can be preserved. Consequently, if the number of processes is greater than the number of instances of the shared resource 13, the shared resource 13 is not available for all processes requesting the shared resource. Examples of the shared resource 13 may be, inter alia, processor cycles for execution, electrical data buses and networks for data transfer, messages transferred through communication protocols, etc. In computer systems, the lock 14 is used when any type of resource is shared, especially in a multi-user and/or multi-tasking computing environment. An example of such multi-user computing environment is an operating system kernel that services multiple processes as in Linux®, UNIX®, etc. (Linux is a trademark of the Linux Mark Institute in the United States and/or other countries; UNIX is a trademark of the Open Group in the United States and/or other countries.)

A process A 11 already holds the shared resource 13 when a process B 12 accesses the shared resource 13. The lock 14 prevents the process B 12 from holding the shared resource 13 for the mutual exclusion. The process B 12 must wait until the shared resource 13 becomes available. The situation where processes are competing for the shared resource 13 that is protected by the lock 14 is referred to as a lock contention.

The process B 12 waits until the lock is released for the shared resource. While waiting for the lock to be released, the process B 12 may or may not consume processor cycles. If the process B 12 is scheduled for processor cycles while waiting for the lock, such waiting is referred to as busy-wait or spin. If the process B 12 is suspended from scheduling while waiting for the lock, the process B 12 does not consume processor cycles for the wait at an expense of context switches for the suspending and resuming the process. The process B 12 waiting for the lock 14 to be release may spin, suspend, or combined spin-and-suspend the execution of the process. Spinning is more efficient than suspending the process if the lock is released soon such that wasted processor cycle while waiting is less than the amount of time for context switches necessary for suspending the process and resuming the suspended process. Suspension is more efficient than spinning the process if the lock is not released for long time such that wasted processor cycle while waiting is greater than the amount of time for context switches necessary for suspending the process and resuming the suspended process. See descriptions in step 120 of FIG. 3, infra, for details on determining whether to spin or to suspend a waiting process.

One of conventional lock methods uses an adaptive method that combines both spin and suspend such that wait is dynamically adapt to a workload of the computer system. An example of a conventional adaptive mutex is implemented as PTHREAD_MUTEX_ADAPTIVE_NP of the GNU libc in the function pthread_mutex_lock( ), in file nptl/pthread_mutex_lock.c. In the conventional adaptive mutex, the process spins while the process attempts to acquire the lock for a limit number of failed attempts. After trying to acquire the lock for the limit number of failed attempts, the process suspends for further waiting. The conventional adaptive mutex uses a learning function to adjust the limit number of failed attempts before suspending a process. Thus, if a lock is contended for a long time, the limit gets longer for all attempts to acquire the lock, resulting in waste of processor cycles. Also, the learning function that counts only the number of failed attempts and determines the limit number of failed attempts may not effectively determine whether the process to spin or to suspend because the learning function does not take into account effects of long contended lock after the limit number of failed attempts, and because the learning function counts only the number of failed attempts, not a time period of waiting. Moreover, counting failed attempts does not reflect physical clock ticks or processor cycles in case of virtual processor cycles are used.

Throughout this specification, a lock, a mutex, resource synchronization or synchronization are used interchangeably.

Figure 2:
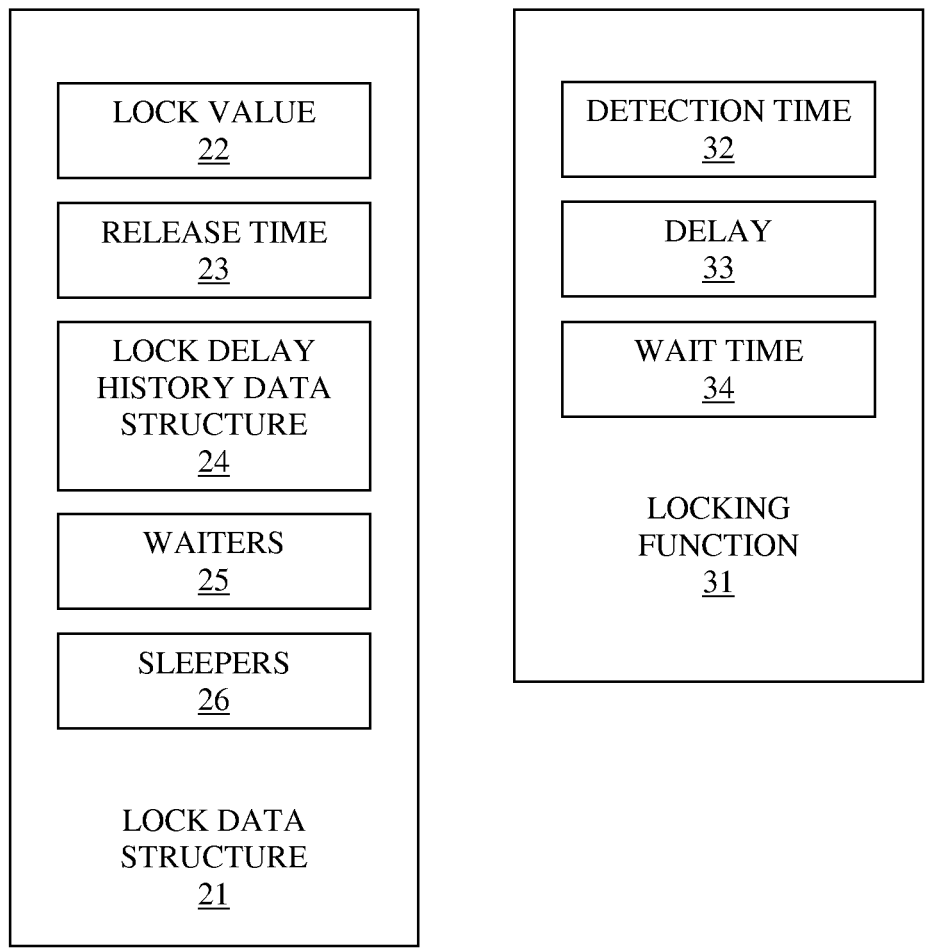
FIG. 2 illustrates data structures used in a dynamically adaptive mutual exclusion method using process counts described in FIGS. 3 and 4, in accordance with the embodiments of the present invention.
Figure 3:
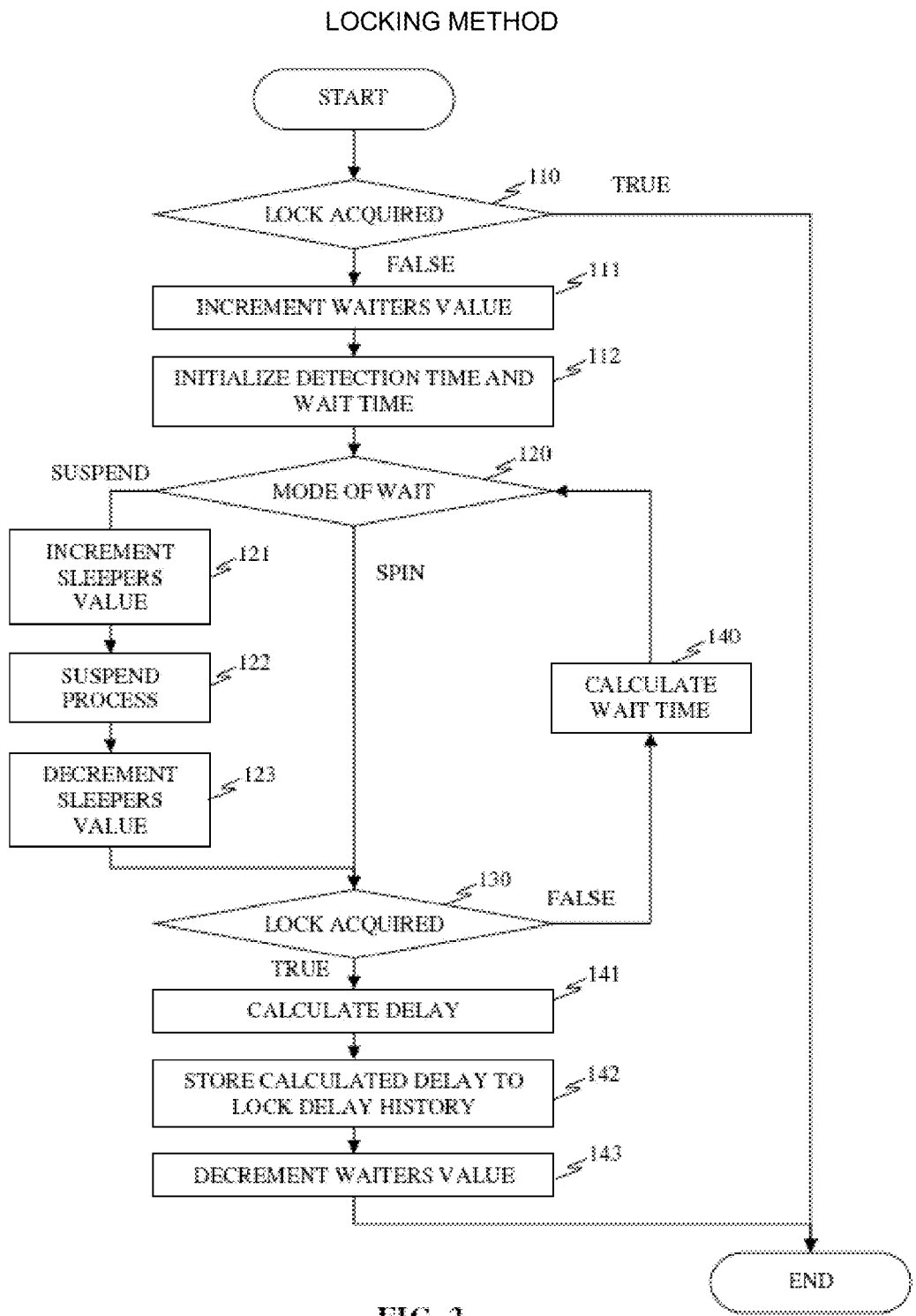
FIG. 3 is a flowchart depicting a method for locking a shared resource in the dynamically adaptive mutual exclusion using process counts, in accordance with the embodiments of the present invention.
Figure 4:
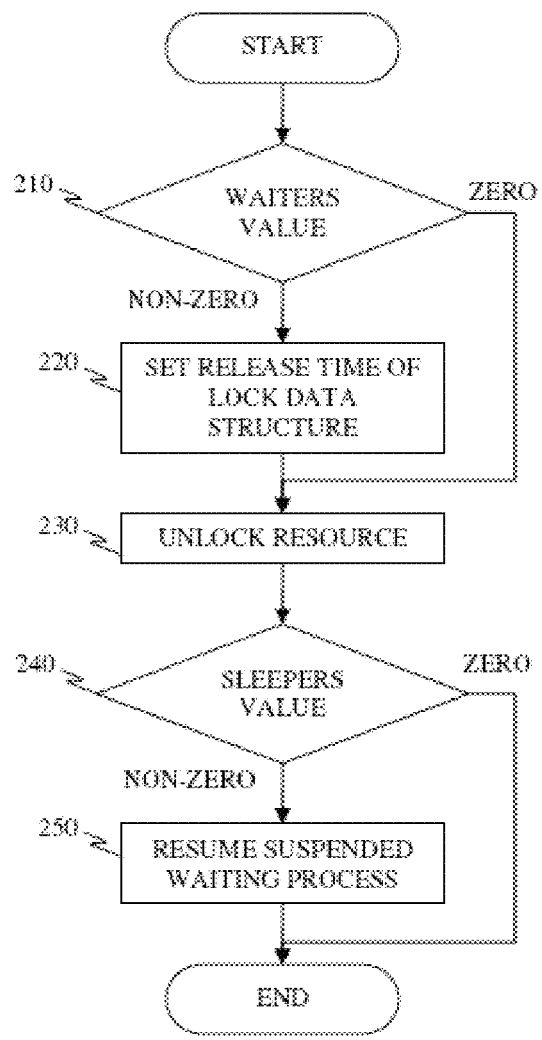
FIG. 4 is a flowchart depicting a method for unlocking a shared resource in the dynamically adaptive mutual exclusion using process counts that corresponds to the method for locking described in FIG. 3, in accordance with the embodiments of the present invention.

FIG. 2 illustrates data structures used in a dynamically adaptive mutual exclusion method using process counts described in FIGS. 3 and 4, infra, in accordance with the embodiments of the present invention.

The data structure for dynamically adaptive mutual exclusion comprises a LOCK 21 data structure and local variables in a locking function 31. The LOCK 21 data structure comprises a LOCK VALUE 22 variable, a RELEASE TIME 23 variable, a LOCK DELAY HISTORY 24 data structure, a WAITERS 25 variable, and a SLEEPERS 26 variable.

The LOCK VALUE 22 variable stores a data value that indicates whether lock is available for a process or unavailable as being held by other process.

The RELEASE TIME 23 variable stores a data value representing a point of time when the lock is most recently released.

The LOCK DELAY HISTORY 24 data structure comprises at least one data value representing a past delay. The at least one data values in the LOCK DELAY HISTORY 24 data structure is used in determining whether the process should spin or suspend while waiting. See step 120 of FIG. 3, infra, for details.

The WAITERS 25 variable represents the number of processes waiting for the lock to be released, whether the process spins or is suspended.

The SLEEPERS 26 variable represents the number of processes that are suspended while waiting for the lock to be released.

The local variables in the locking function 31 comprise a DETECTION TIME 32 variable, a DELAY 33 variable, and a WAIT TIME 34 variable.

The DETECTION TIME 32 variable stores a data value representing the time that the lock contention is detected, that is, when the lock has been first attempted and failed because of the lock contention. The DETECTION TIME 32 variable is initialized when an attempt for the lock is failed for the first time, and is maintained until the lock function returns.

The DELAY 33 variable stores a data value representing a difference between a time value when the lock was most recently released and the data value of stored in the DETECTION TIME 32 variable, i.e., DELAY=$\Delta$(time(acquisition), time(detection)) or $\Delta$(RELEASE TIME, DETECTION TIME). The DELAY 32 variable is calculated, upon acquiring the lock, to measure and to store the total amount of time spent waiting for the lock.

The WAIT TIME 34 variable stores a data value representing a lapse of time that the process has spent so far waiting for the lock, that is a difference between a data value of current time and the data value stored in the DETECTION TIME 32 variable, i.e., WAIT TIME=$\Delta$(time(current), time(detection)) or $\Delta$(NOW( ), DETECTION TIME). The WAIT TIME 34 variable is initialized to zero (0) upon detecting a lock contention, and then is updated on respective unsuccessful try to acquire the lock.

In one embodiment of the present invention, a data value for each variable is measured by a real clock through physical clock ticks, or physical processor cycles. In other embodiment of the present invention, a data value for each variable is measured by a virtual clock that only counts a subset of processor cycles spent in a corresponding virtual subsystem of processors comprising a process tries the lock. In another embodiment, a data value for each variable is measured by a combined physical-virtual processor cycles.

FIG. 3 is a flowchart depicting a method for locking a shared resource in the dynamically adaptive mutual exclusion using process counts, in accordance with the embodiments of the present invention.

In the method described in steps 110 to 143, a process that invokes a locking function may have zero (0) or one (1) lock for a shared resource. In other embodiment, a process having a lock may require another lock, wherein such reentry to the locking function is accommodated by a wrapper function based on a number of shared resource and the nature of the process.

In step 110, the locking function attempts to acquire a lock for a process that invoked the locking function. If the lock is acquired, the lock is immediately returned to the process that invoked the locking function, and the locking function terminates. If the lock is not acquired, indicating that the lock is held by other process, the locking function proceeds with step 111.

In step 111, the locking function increments, that is, increases by one (1), a value of the WAITERS variable in the lock data structure, indicating that the number of processes waiting for the lock is incremented because the process that had failed to acquire the lock must wait for the lock along with other processes that already wait for the lock.

In step 112, the locking function stores a current time value in the DETECTION TIME variable representing the time of first failed attempt to acquire the lock. The locking function also set the WAIT TIME variable that represents a difference between a data value of current time and the data value stored in the DETECTION TIME variable to zero (0).

In step 120, the locking function determines whether the process spins or suspends while waiting for the lock to be released. As noted in FIG. 1, supra, a spin is a more efficient waiting strategy for short waits; a suspend-resume is a more efficient waiting strategy for long waits, compared with an overhead time necessary for the context switches in case of suspension and resumption.

In determining whether to spin or to suspend the process, the locking function first calculates an expected delay for the lock on a next attempt as a difference between the AVERAGE DELAY and the WAIT TIME, i.e., $\Delta$(AVERAGE DELAY, WAIT TIME), wherein the AVERAGE DELAY is an average data value of a finite number of past delays stored in the LOCK DELAY HISTORY data structure, wherein the WAIT TIME is a data value stored in the WAIT TIME variable as WAIT TIME=$\Delta$(current time, DETECTION TIME), wherein DETECTION TIME=time(first failed try) or time(detection).

The locking function then compares the expected delay with a context switch time representing the amount of time for context switches necessary for suspending the process and resuming the suspended process. The context switch time is defined as a set of constant time values that take to switch process context in and out of memory pages for an execution depending on implementation of the computing environment on which the locking function is performed.

If the expected delay for the next attempt is greater than the context switch time, the locking function determines to suspend the process and proceeds with step 121. If the expected delay for the next attempt is less than the context switch time, the locking function determines to spin the process and proceeds with step 130.

In other embodiment of the present invention, the locking function may perform step 120 with other calculations with data values in the LOCK DELAY HISTORY data structure such that optimize the performance of the computer system. The locking function may use, inter alia, a latest delay, and an average data value of a finite number of past delays, or a weighted average of a finite number of past delays, etc., instead of the expected delay. In another embodiment of the present invention, the LOCK DELAY HISTORY data structure can be analyzed to log fluctuation of data values for past delays for the lock function to calculate a probability of a specific value for an expected delay. In still other embodiment, the context switch time may be scaled by other factors of the computing environment. Examples of other factors of the computing environment may be, inter alia, numbers representing current utilization of at least one physical or virtual processor in the computing environment, a total number of contended locks in the computing environment, the ratio of virtual to physical processor cycles in the computing environment, or combinations of these values etc.

In step 121, the locking function increments, i.e., increases by one, the SLEEPERS value of the LOCK data structure, because the process will be suspended while waiting for the lock. Then the locking function proceeds with step 122.

In step 122, the locking function suspends the process that had been determined for a suspension in step 120. The suspended process does not execute, i.e., does not consume processor cycles, until the suspended process is resumed by a supervisor process or a virtual machine monitor called a hypervisor. Once the suspended process is resumed, the locking function proceeds with step 123.

In step 123, the locking function decrements, i.e., decreases by one, the SLEEPERS value of the LOCK data structure, because the count of suspended processes waiting for the lock decreases as the process is resumed. After the process is resumed and the SLEEPERS value decremented, the locking function proceeds with step 130.

In step 130, the locking function attempts to acquire the lock again. If the lock is acquired, the lock is immediately returned to the process that invoked the locking function, and the locking function proceeds with step 141. If the lock is not acquired, indicating that the lock is still held by another process, the locking function proceeds with step 140.

In step 140, the locking function updates the data value of the WAIT TIME variable with a difference between a data value of current time and the data value stored in the DETECTION TIME which indicates the time of first failed attempt to acquire the lock. The data value of the WAIT TIME variable represents the amount of time elapsed while waiting for the lock up to the previous failed attempt. The lock function subsequently loops back to step 120 to determine whether to spin or to suspend the process with the updated data value of the WAIT TIME variable. Updating the data value of the WAIT TIME variable enables the locking function to correctly reflect how long the process have been spinning in a virtualized computing system in which a hypervisor often preempts spin loops. Because the preempted spin loops attempts to acquire the lock fewer times than it is expected in busy-waiting, actual wait may be significantly longer than a number of failed attempts multiplied by processor cycles per attempt. Such preemption makes a number of failed attempts less significant in adaptively determining whether to spin or to suspend.

In step 141, the locking function calculates a data value of the DELAY variable, that is a difference between a time value when the lock was most recently released and the data value of stored in the DETECTION TIME, i.e., DELAY=$\Delta$(time (acquisition), time(detection)) or $\Delta$(RELEASE TIME, DETECTION TIME). The data value of the DELAY variable represents the total lapse of time from the first failed attempt until the acquisition of the lock. Although very rare, the lock may be released right after step 110 while the lock function performs steps 111 and 112, which results in an exceptional case that a data value of the RELEASE TIME variable is less than the data value of the DETECTION TIME variable. The locking function set the data value of the DELAY variable to zero (0) if the data value of the RELEASE TIME variable is less than the data value of the DETECTION TIME variable. The lock function then proceeds with step 142.

In step 142, the locking function stores the data value of the DELAY variable calculated in step 141 to one of variables in the LOCK DELAY HISTORY data structure. The data values stored in the LOCK DELAY HISTORY data structure is used in step 120 that enables the locking function to determine whether to spin or to suspend the process according to dynamic workload changes of the computer system.

FIG. 4 is a flowchart depicting a method for unlocking a shared resource in the dynamically adaptive mutual exclusion using process counts that corresponds to the method for locking described in FIG. 3, supra, in accordance with the embodiments of the present invention.

In the method described in steps 210 to 250, an unlocking function unconditionally release a lock. As described in FIG. 3, supra, if a locking function is reentrant with a wrapper function, an unlocking function that corresponds to the locking function is adapted accordingly with a corresponding wrapper function.

In step 210, the unlocking function determines whether the WAITERS value in the LOCK data structure is zero (0) or not. The WAITERS value read in step 210 of the unlocking function is coherent with the WAITERS value incremented in step 111 of the locking function described in FIG. 3, supra. If the unlocking function determines that the WAITERS value in the LOCK data structure is zero, the unlocking function proceeds with step 230, because there is no process waiting for the lock, and consequently there is no need to record time of releasing the lock. If the unlocking function determines that the WAITERS value in the LOCK data structure is non-zero, the unlocking function proceeds with step 220.

In step 220, the unlocking function stores a current time value in the RELEASE TIME variable of the LOCK data structure, which is used to calculate the data value of the DELAY variable in step 141 of FIG. 3, supra.

In step 230, the unlocking function releases the lock and makes the resource available to a waiting process.

In step 240, the unlocking function determines whether the SLEEPERS value in the LOCK data structure is zero (0) or not. The SLEEPERS value read in step 240 of the unlocking function is coherent with the SLEEPERS value incremented in step 121 of the locking function described in FIG. 3, supra. If the unlocking function determines that the SLEEPERS value in the LOCK data structure is zero (0), the unlocking function terminates, because there is no process suspended for the lock, i.e., there is no process to resume. If the unlocking function determines that the SLEEPERS value in the LOCK data structure is non-zero, the unlocking function proceeds with step 250.

In step 250, the unlocking function resumes the waiting process that is suspended to wait for the lock to be released.

Figure 5:
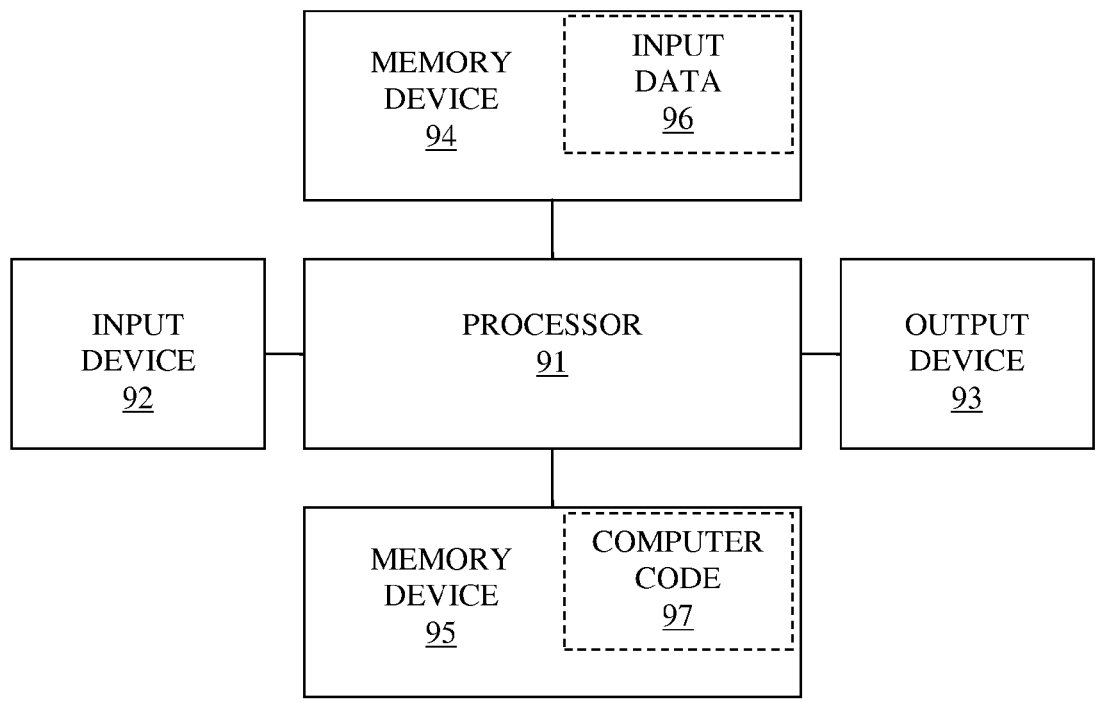
FIG. 5 illustrates a computer system used for dynamically adaptive mutual exclusion using process counts, in accordance with embodiments of the present invention.

FIG. 5 illustrates a computer system 90 used for dynamically adaptive mutual exclusion using process counts, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for dynamically adaptive mutual exclusion using process counts according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for mutually exclusively executing a critical section by a process in a computer system, wherein a lock acquired by the process permits the process an access to the critical section, the method comprising:
   in response to an attempt by the process to acquire the lock at an initial time, determining, by a processor of a computer system, that the lock is not currently available for being acquired by the process;
   in response to said determining that the lock is not currently available for being acquired by the process, performing, by the processor, a loop of N iterations, wherein N is at least 1, and wherein each iteration comprises:
      calculating a wait time as a difference between a current time and the initial time;
      determining an average time delay as an average time difference, based on historical data, between a time at which a lock is acquired and a time at which a first attempt to acquire the lock is made;
      determining an expected time delay as a difference between between the average time delay and the wait time;
      determining a context switch time;
      determining whether the expected time delay exceeds the context switch time, and if so then suspending the process from consuming processor cyles and subsequently resuming the process by a supervisor process or a virtual machine monitor, and if not then spinning the process by enabling the process to consume processor cycles; and
      ascertaining whether an attempt by the process, after said resuming the process or said spinning the process, to acquire the lock was successful, and if so then exiting the loop, and if not then performing a next iteration of the loop, wherein said exiting the loop is performed in iteration N.

2. The method of claim 1, wherein N is 1.

3. The method of claim 1, wherein N is at least 2.

4. The method of claim 1, wherein iteration 1 comprises said suspending the process.

5. The method of claim 4, wherein N is 1.

6. The method of claim 4, wherein N is at least 2.

7. The method of claim 1, wherein iteration 1 comprises said spinning the process.

8. The method of claim 7, wherein N is 1.

9. The method of claim 7, wherein N is at least 2.

10. The method of claim 9, wherein iteration N comprises said spinning the process.

11. The method of claim 9, wherein iteration N comprises said suspending the process.

12. The method of claim 1, wherein N is at least 2, said method comprising:
   after said ascertaining, recalculating the wait time, based on the current time after said ascertaining, in each iteration in which said ascertaining ascertains that the attempt by the process, after said resuming the process or said spinning the process, to acquire the lock was not successful.

13. The method of claim 1, wherein at least one iteration of the N iterations comprises said suspending the process, and wherein each iteration of the at least one iteration comprises:
   after said determining that the expected time delay exceeds the context switch time and before said suspending the process, (i) incrementing by one a sleeper count of a total number of processes that are currently suspending the respective process in waiting for the lock to become available for being acquired by the respective process and (ii) storing the incremented sleeper count in a lock data structure in the computer system; and
   after said suspending the process and before said ascertaining, (i) decrementing the sleeper count by one and (ii) storing the decremented sleeper count in the lock data structure.

14. The method of claim 1, said method comprising:
   after said determining that the lock cannot be currently acquired by the process and before said performing the loop, (i) incrementing, by the processor, by one a wait count of a total number of processes that are waiting for the lock to become available for being acquired by the respective process and (ii) storing, by the processor, the incremented wait count in a lock data structure in the computer system; and
   after said exiting the loop, (i) decrementing, by the processor, the wait count by one and (ii) storing, by the processor, the decremented wait count in the lock data structure.

15. The method of claim 1, said method comprising:
   after said exiting the loop, calculating, by the processor, a lock release delay as a difference between a lock release time and the initial time, wherein the lock release time is a time at which the lock became available during performance of iteration N for being acquired by the process and preceded the successful attempt by the process, after said resuming the process or said spinning the process, to acquire the lock; and
   storing, by the processor, the calculated lock release delay in a lock data structure in the computer system.

* * * * *